United States Patent
Hahn

(10) Patent No.: US 11,685,100 B2
(45) Date of Patent: Jun. 27, 2023

(54) SYSTEM AND METHOD FOR CARRYING OUT A CHANGEOVER PROCESS IN A BEVERAGE PRODUCTION PLANT

(71) Applicant: KRONES AG, Neutraubling (DE)

(72) Inventor: Wolfgang Hahn, Neutraubling (DE)

(73) Assignee: KRONES AG, Neutraubling (DE)

( * ) Notice: Subject to any disclaimer, the term of this patent is extended or adjusted under 35 U.S.C. 154(b) by 163 days.

(21) Appl. No.: 15/505,744

(22) PCT Filed: Sep. 12, 2016

(86) PCT No.: PCT/EP2016/071443
§ 371 (c)(1),
(2) Date: Feb. 22, 2017

(87) PCT Pub. No.: WO2017/050599
PCT Pub. Date: Mar. 30, 2017

(65) Prior Publication Data
US 2017/0274576 A1     Sep. 28, 2017

(30) Foreign Application Priority Data
Sep. 23, 2015   (DE) ............... 10 2015 116 037.4

(51) Int. Cl.
*B29C 49/48*     (2006.01)
*B29C 49/06*     (2006.01)
*B29C 49/36*     (2006.01)

(52) U.S. Cl.
CPC .............. *B29C 49/48* (2013.01); *B29C 49/06* (2013.01); *B29C 49/36* (2013.01); *B29C 2049/4858* (2013.01)

(58) Field of Classification Search
None
See application file for complete search history.

(56) References Cited

U.S. PATENT DOCUMENTS 5,470,218 A * 11/1995 Hillman ............... B29C 45/768
264/40.6
2009/0178264 A1 * 7/2009 Stoiber ............... B29C 49/42
29/401.1
(Continued)

FOREIGN PATENT DOCUMENTS

DE      102009040977 A1   3/2011
DE      102010042165 A1   4/2012
(Continued)

OTHER PUBLICATIONS

Chinese Office Action dated Aug. 8, 2018—Application No. 201680002632.9.

*Primary Examiner* — David P Turocy
(74) *Attorney, Agent, or Firm* — Schmeiser, Olsen & Watts, LLP

(57) ABSTRACT

A method for carrying out a changeover process in a system for producing beverage containers is provided. This system in operation produces plastic containers from plastic parisons by a transforming device and these produced containers are transported to a filling device and the containers are filled with a liquid and in particular a beverage, wherein the liquid is introduced into the container at a temperature of over 50° C., wherein at least the transforming device and the filling device are at least intermittently in data communication with one another and for carrying out the changeover process of at least the transforming device or the filling device a value is output and/or used which is characteristic for a changeover status of this transforming device or this filling device.

20 Claims, 2 Drawing Sheets

(56) References Cited

U.S. PATENT DOCUMENTS

| | | | | |
|---|---|---|---|---|
| 2010/0327474 | A1* | 12/2010 | Hirdina | B29C 31/006 |
| | | | | 264/39 |
| 2012/0036693 | A1 | 2/2012 | Stoiber | |
| 2012/0312419 | A1* | 12/2012 | Wagner | A23C 3/027 |
| | | | | 141/11 |
| 2013/0052295 | A1* | 2/2013 | Schoenberger | B29C 49/786 |
| | | | | 425/526 |
| 2013/0207319 | A1* | 8/2013 | Haesendonckx | B29C 49/48 |
| | | | | 264/530 |
| 2015/0037518 | A1* | 2/2015 | Haner | B29C 49/12 |
| | | | | 428/29 |
| 2015/0052853 | A1* | 2/2015 | Wasserle | B65C 3/26 |
| | | | | 53/473 |

FOREIGN PATENT DOCUMENTS

| | | | | |
|---|---|---|---|---|
| DE | 102011050724 | A1 | 12/2012 | |
| DE | 102012206295 | A1 * | 10/2013 | ............. B67C 3/007 |
| DE | 102012104267 | A1 | 11/2013 | |

\* cited by examiner

SYSTEM AND METHOD FOR CARRYING OUT A CHANGEOVER PROCESS IN A BEVERAGE PRODUCTION PLANT

CROSS-REFERENCE TO RELATED APPLICATIONS

This application claims priority to PCT Application No. PCT/EP2016/071443, having a filing date of Sep. 12, 2016, based on DE 10 2015 116 037.4, having a filing date of Sep. 23, 2015, the entire contents of which are hereby incorporated by reference.

FIELD OF TECHNOLOGY

The following relates to a system and a method for producing beverage containers. In particular the following relates to systems and methods for producing hot bottled liquids or liquids to be bottled while hot, and in particular beverages. It is known from the known art that various beverages, such as for example iced tea, are bottled while hot. In the known art the operation of such machines is relatively complex.

BACKGROUND

In this connection it should be borne in mind that, in the applications described here, first of all plastic bottles are produced, for example by a stretch blow moulding machine, and these are then filled with a heated beverage. For this purpose, when starting the apparatus very many apparatus parts must be treated separately. Thus for example the blow moulds must be temperature-controlled or heated in the blow moulding machine and, furthermore, a flash heater (referred to below as KZE) must be heated up and also the filler or the filling device itself must be heated up in order to enable the hot bottling of the beverage.

In this case in the known art, after or during the setting-up of the apparatus or of the block, the machine user must first of all start the heating of the blow moulds, must also initiate the flash heating and heat the filling device and finally must start the heating of the oven in good time for heating up plastic parisons. Thus the starting sequence also depends upon the particular operator. At the same time he must initiate operations in order to ensure the optimal sequence. If an operation takes place too late, time is lost, resulting in a lower OEE (overall equipment effectiveness). If an operation takes place too early, energy is lost, resulting in higher energy costs.

SUMMARY

An aspect relates to container production processes and systems more effectively, particularly on starting.

The following therefore relates to a method for carrying out a changeover process in a system for producing beverage containers, wherein this system in operation (i.e. in particular in a production facility which serves in particular for the production of filled plastic containers (preferably filled with beverages)) produces plastic containers from plastic parisons by a transforming device and these produced containers are transported to a filling device and the containers are filled with a liquid and in particular a beverage, wherein the liquid is introduced into the container at a temperature of over 50° C. This temperature is preferably above 55° C., preferably above 60° C., preferably above 65° C. and particularly preferably above 70° C.

According to embodiments of the invention the transforming device and the filling device are at least intermittently in data communication and for carrying out of the changeover process of at least the transforming device or the filling device a value is output and/or used which is characteristic for a changeover status of this transforming device and/or this filling device.

In this case it is possible for the transforming device and the filling device and/or the control devices thereof to be directly in data communication with one another. In this case it would also be possible for the transforming device and the filling device to be in data communication with one another via a higher-level control device. Further devices of a corresponding apparatus, such as for instance a flash heater or a heating device for heating plastic parisons (or the control device thereof) can also be in a corresponding data communication with the filling device and/or the transforming device. A data communication is understood to be a communication link by means of which data, such as for instance characteristic data for times or temperatures, can be exchanged.

Therefore according to embodiments of the invention it is proposed that said apparatus parts, such as for instance a filling device or the transforming device, communicate with one another, wherein it is also possible for said apparatus parts to communicate with a (higher-level) control device.

The transforming device preferably has a control device for controlling it. The filling device preferably also has a control device for controlling it. These control devices preferably communicate with one another.

The illustrated machines, i.e. in particular the transforming device and the filling device, but also advantageously further machines such as for instance a flash heater, are advantageously machines which are synchronised with one another or machines which operate as a block. A synchronisation is understood here in particular as a synchronisation with regard to operating speed. Thus, for example, a machine can predetermine a specific production speed and the other machines can follow it. Thus in the event of a change of the operating speed of one of these machines, the respective operating speeds of the other machines change in response. Thus a higher-level control device could be provided, which changes the operating speed of the individual machines uniformly. Furthermore, it would be conceivable for buffering devices to be provided between individual machines which enable buffering of containers, for instance buffering of container which have been blow moulded but not filled.

Furthermore, a changeover process preferably takes place at least with partial automation, preferably by a direct data exchange between the transforming device, the filling device and possibly further devices. In a further preferred method data are output, such as for instance the duration of heating or a temperature of specific elements of the transforming device or the filling device, such as for instance a beverage to be bottled or blow mould elements.

These data are in turn the basis for the conversion or changeover. A changeover process is understood hereafter in particular as a change a beverage type, a change of containers or the like. In particular, the changeover process is an operation which necessitates a change of at least one element, for example a change of blow moulds, of filling elements or the like. If for example blow moulds have to be replaced, it is necessary for the newly modified or fitted blow moulds to be heated again to an operating temperature.

A value which is characteristic for the changeover process is, as explained in greater detail below, a value which characterises this specific changeover process. This is in particular a value which changes over time or a time value, for instance a time period for which a certain heating has already lasted or an input value which characterises the conclusion of a changeover process.

The method preferably takes place in a plurality of steps, wherein, preferably during cooling or heating times of specific apparatus parts, other set-up operations (on other apparatus parts) are carried out. Thus it would be possible, for example, that during cooling of the blow moulds to be inserted changeover processes are already carried out at the same time on an oven for heating plastic parisons.

The following has been described here specifically with reference to hot filling processes, but it is pointed out that embodiments of the invention can also be used in other types of machines and/or other combinations of machines, for instance in a system which has a cleaning machine for cleaning glass bottles and a subsequent filling device for filling glass bottles.

In a further preferred method, in the context of a changeover process a conversion process is also carried out at least on the transforming device and/or the filling device, wherein at least one element of this transforming device or the filling device is changed. Thus, for example, this conversion process may be a process in which blow moulds are replaced by other blow moulds (for the production of other containers). In this case the conversion process can take place manually by a user or also automatically (in particular also using robots).

In a further preferred method at least one parameter which is characteristic for the conversion is also taken into account in the changeover process. Thus, for example, it is possible and preferable for a user to enter into the system a feedback message relating to the setup work which has been carried out. Thus it is possible, for example, for the user to confirm that a specific conversion process, for instance the changing of blow mould (or a plurality of or all blow moulds) or of part of a blow mould, for instance the side parts thereof, has been carried out. For the system this signifies the instruction that now, for example, the heating of these blow moulds can be started. Thus the value which is characteristic for the conversion process is characteristic for ending the relevant conversion process.

The procedures described here can increase the OEE due to a shorter time for conversion in particular on a block machine. A saving of energy also results from a more highly automated process. For example, no component of the system has to wait and be heated unnecessarily.

In a further preferred method, on the transforming device a conversion process from a first set of blow moulds to a second set of blow moulds is carried out and at least one value which is characteristic for this conversion process value is used for the changeover process. In this case in particular—as mentioned—this may be a confirmation that the said conversion process has been carried out. A conversion process is understood hereafter in particular to be the replacement of an element required by the machine, in particular the replacement of a set in particular of the same type of elements, such as specifically—as mentioned above—the same type of blow moulds by different blow moulds for the production of different containers. Particularly preferably, therefore, the method according to embodiments of the invention is used on changeover methods which also include conversion processes.

In a further preferred method, for the changeover process at least one element of the transforming device and/or at least one element of the filling device is heated. In particular, both at least one element of the transforming device and also one element of the filling device is heated. The element of the transforming device may be in particular blow moulds or components thereof. The element of the filling device may for example be a receiving tank for receiving beverages to be bottled. In addition, liquid pipes which serve for conveying the liquid to be bottled can also be heated.

In a further preferred method a heating of the beverage and in particular a flash heating of the beverage can be carried out. Preferably in the context of a changeover process at least one parameter of the flash heater is also changed and/or at least one element of the flash heater is changed.

In a further preferred method, in the context of the production process at least one container is sterilised. In this case it is possible for the plastic parisons to be already sterilised before they are transformed into the plastic containers. It would also be possible for the plastic containers to be sterilised. In this case it would be possible for the plastic parisons to be sterilised before they are transformed into the plastic containers.

In a further preferred method the container is cooled after filling. In this case the cooling can take place by supplying the container with a free-flowing medium. In a further preferred method, during operation the container is closed immediately after filling.

In a method sequence for a changeover of a corresponding machine first of all preferably heating of the blow moulds of the blow moulding machine takes place, preferably immediately after the setting-up of the blow moulding machine. The heating of these blow moulds is preferably started first of all, since this takes the longest time. Thus it is possible that at the start of the heating of the blow moulds a time is set, for example 34 minutes, and counts down. This is the presumed longest time required for heating of the blow moulds. However, this can preferably be set individually.

In a further method step a heating module of the blow moulding machine (i.e. of the transforming device) is heated. This is in particular the oven which heats the plastic parisons to a temperature which is necessary for the transforming process, for example a blow moulding operation. This can take place for example a specific time before the operation of the system, for example 5 minutes before operation, if the heating device requires 5 minutes in order to reach the operating temperature. In a further method step the above-mentioned flash heater is started. For the flash heating a relatively long time period, for example approximately 30 minutes, is usually required. Thus for example as the clock counts down it is possible to ascertain when heating of this module is started.

In general the heating of at least one processing device is preferably controlled or started automatically. In particular the heating at least one module of the machine is controlled as a function of a time value, in particular as a function of an already running heating time of another assembly. Thus for example it may be recorded that heating of a flash heater takes place a predetermined time period after the start of heating of the transforming device, for example 10 minutes after the start of the blow mould heating.

The heating of a plurality of processing devices is preferably controlled automatically and in particular is controlled automatically as a function of time sequences.

In a preferred method—as mentioned above—with the start of the heating of a device, for instance the transforming device, a time sequence is set in operation and at predetermined times within this time sequence further heating steps, such as for instance heating of the filling device and/or heating of the flash heater, are initiated by an automated process. Thus a time control for the initiation of the heating processes of the individual processing devices is preferably provided.

In a further preferred method, the heating of the filling device and/or a start of the operation of the filling device are also started at a predetermined time. Lastly, introduction of the product, i.e. the containers and/or the beverage, into the filling device is started.

The transforming device, the filling device and the flash heater are preferably ready for production at substantially the same time (at a predetermined time or time period) and the remaining set-up operations on the entire system are preferably accomplished at this time. Advantageously, however, the individual set-up operations are polled, i.e. a confirmation can be input which shows that corresponding set-up operations have been carried out. In this case, however, it is also possible that these conversion processes are not carried out by a user, but by robots. In a further method, after the changeover, heating and set-up operations have been carried out a test run is initiated. This test run can be started automatically.

In a further preferred method the value which is characteristic for the changeover status of the transforming device is a time value or a value which is characteristic for a temperature of at least one element of the transforming device or of the filling device. The changeover status is preferably a time-dependent status and/or a temperature-dependent status, i.e. the status of a specific processing device, such as the transforming device or the filling device or the flash heater at a specific time, for example the temperatures of elements of these respective devices.

In a further preferred method, in the context of the changeover process at least one element of the transforming device and at least one element of the filling device is heated, wherein the heating of the element of the transforming device is started at a different and in particular earlier time than the heating of the element of the filling device. Preferably at least one parameter of the flash heater is also heated. This element of the flash heater is advantageously started after the heating of the element of the transforming device. The heating of the flash heater preferably takes place before the commencement the heating the filling device or the elements.

In a further preferred method the time for the start of the heating of the element of the filling device is determined as a function of a time for the start of heating of the element of the transforming device. As mentioned above, it is known how long the individual heating operations last. Therefore characteristic data are output for the respective time intervals and/or times at which the heating is started. In this way the individual heating operations can be switched on—preferably automatically. In each case the time required for the individual heating operations can be taken into consideration.

In a further preferred method, temperatures of elements of the transforming device, the filling device or the flash heater are measured. These measured values are also advantageously taken into consideration in the changeover process. Thus it would be possible for example that the heating of a specific machine, for instance the flash heater is only started when the (already replaced) blow moulds have reached a specific temperature during heating. In this case control does not take place as a function of time but as a function of temperature. A combination of these procedures is also conceivable.

Furthermore, embodiments of the present invention are directed to the production of beverage containers. This system has a transforming device which transforms the plastic parisons into plastic containers and a filling device which fills the plastic containers produced by the transforming device with a liquid and in particular with a beverage. In this case the filling device is configured in such a way that the liquid is introduced into the container at a temperature above 50° C., preferably above 55° C., 66° C., 65° C., 70° C. Furthermore, the system has a heating device and in particular a flash heater which is suitable and intended for heating the liquid to be introduced into the container. In this case it is possible that this flash heater is a continuous flow heating device.

According to embodiments of the invention the system has a time management system and/or temperature management system which controls the start of production of the system taking into account heating times of the transforming device and/or the filling device (or elements of these devices, for instance the blow moulds). The time management system preferably controls the start of production of the system, also taking heating times of the flash heater into consideration. In addition to the time management system, however a temperature management system can also be used which controls the start of production of the system taking into account heating temperatures of the transforming device and/or the filling device (or elements of these devices, for instance the blow moulds).

The transforming device is preferably a blow moulding machine and in particular a stretch blow moulding machine.

In a further advantageous embodiment heating devices are provided in order to heat elements of the transforming device and/or of the filling device. Thus for example blow moulds or mountings for the blow moulds of the transforming device have liquid channels through which a temperature control medium flows. Heating of the blow moulds can take place by means of these channels.

In a further advantageous embodiment a value which is characteristic for a conversion process can be delivered to the time management system. Thus the time management system preferably has an input means, such as for instance a push switch or a touch screen, by means of which the user can confirm that he has carried out a specific conversion process.

Thus for example an input can take place by the user or automatically, in which it is confirmed that a specific conversion, for instance a replacement of blow moulds, has been carried out. This said input can take place manually or also for instance by means of an input confirmation, by means of a robot or the like.

In a further advantageous embodiment the system has a transport device for transporting the plastic parisons. This transport device can for example transport the plastic parisons or plastic containers between the individual processing devices, i.e. for instance of the transforming device and the filling device. In addition pipes can be provided which convey a liquid to be bottled from the flash heater to the filling device.

In a further advantageous embodiment the system, in particular the time management system, has an input device, by means of which a user can supply the time management system with information and in particular information about a conversion process. In a further advantageous embodiment the system has a heating device for heating plastic parisons. This heating device is particularly preferably connected upstream of the transforming device.

In a further advantageous embodiment the time management system is suitable and intended for automatically initiating a heating operation of at least one element of the system. The time management system is capable of carrying out this heating operation as a function of a time value and/or a temperature, for example as a function of a heating operation already carried out on a different element. In general the time management system (or the temperature management system) is suitable and intended for controlling the heating device for the transforming device and/or the filling device and/or the flash heater in order to effect heating of these devices or specific elements of these devices. In particular this time management system is capable of co-ordinating the heating of the said devices with one another.

The element to be heated is advantageously an element of the flash heater, the filling device or the heating device for heating the plastic parisons. Thus for example an element of a continuous flow heating device can be heated for heating the liquid to be bottled.

In a further advantageous embodiment the system has a display device which is suitable and intended for output of data which is characteristic for heating of at least one element of the system. In particular this is a heating time and/or an already elapsed heating time. Particularly preferably the data is also a temperature, in particular a current temperature of the product to be heated.

In a further advantageous embodiment the display device also has a time display and in particular a decrementing time or so-called countdown.

BRIEF DESCRIPTION

Some of the embodiments will be described in detail, with reference to the following figures, wherein like designations denote like members, wherein.

DETAILED DESCRIPTION

Figure 1:
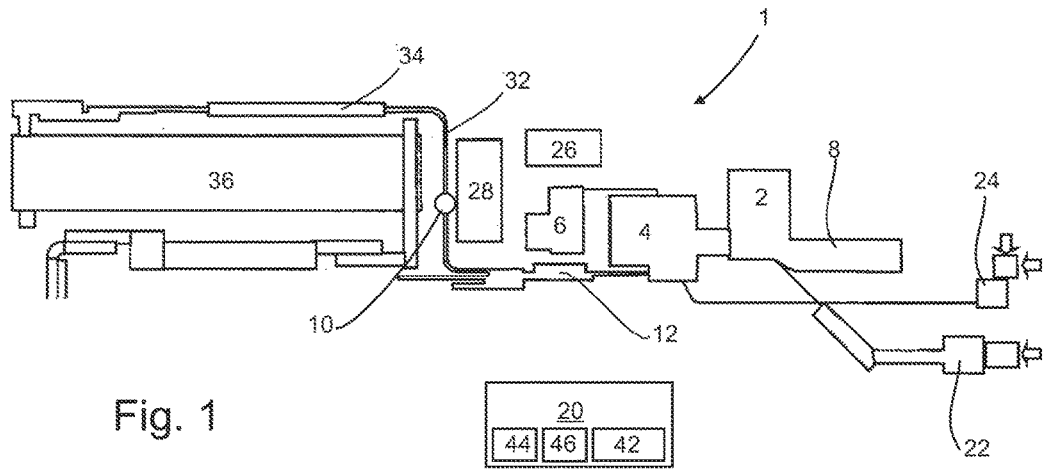
FIG. 1 shows a schematic representation of a system according to embodiments of the invention for processing containers and/or beverages.

FIG. 1 shows a schematic representation of a system according to embodiments of the invention of producing beverage containers 10. This system includes a transforming device 2, for example a stretch blow moulding machine, which transforms plastic parisons into plastic containers. The reference numeral 8 relates to a heating device which serves for heating the plastic parisons delivered to the transforming device 2. The reference numeral 22 relates to a stock of plastic parisons which is delivered to the heating device 8 and to the transforming device 2. However, it would also be possible that already produced plastic containers or also glass containers are delivered directly to the filling device. The reference numeral 24 relates to a stock of already produced containers (possibly also glass containers). If finished containers are delivered, it is also possible to dispense with a transforming device 2. The applicant reserves the right also to claim protection for such an embodiment.

The reference numeral 4 designates quite schematically a filling device which fills the containers produced by the transforming device. In this case the reference numeral 6 designates a flash heater (KZE) which briefly heats the liquid to be introduced. In this case it is possible that this flash heater to be arranged between a collecting reservoir for the liquid and the filling device 4 and for example heats the liquid or the beverage in the manner of a continuous flow heater.

The reference numeral 12 designates quite schematically a closer which closes the filled containers. These containers thus filled are guided by means of a transport device 32 and a further transport line 34 to a cooling device 36, such as a recooler.

The reference numeral 20 designates a time management system which serves for control, in particular for temporal control of the transforming device 2, the filling device 4 and the flash heater 6, as well as also of the preform oven 8. In this case the time management system 20 has, in particular, an image output device 42 by means of which timings can be displayed. The touch screen of the filler can also serve, for example, as image output device. In addition, input elements 44, 46 can also be provided, by means of which the user can input operating steps, such as for instance a confirmation that the blow moulds have been changed. The touch screen, of the blow moulding machine could also serve, for example, as input element. The time management system 20 can control the heating of individual components of the transforming device 2, the filling device 4 and the flash heater 6. In this case the time management system can also, in particular, take account of heating times already carried out or heating times completed.

Figure 2:
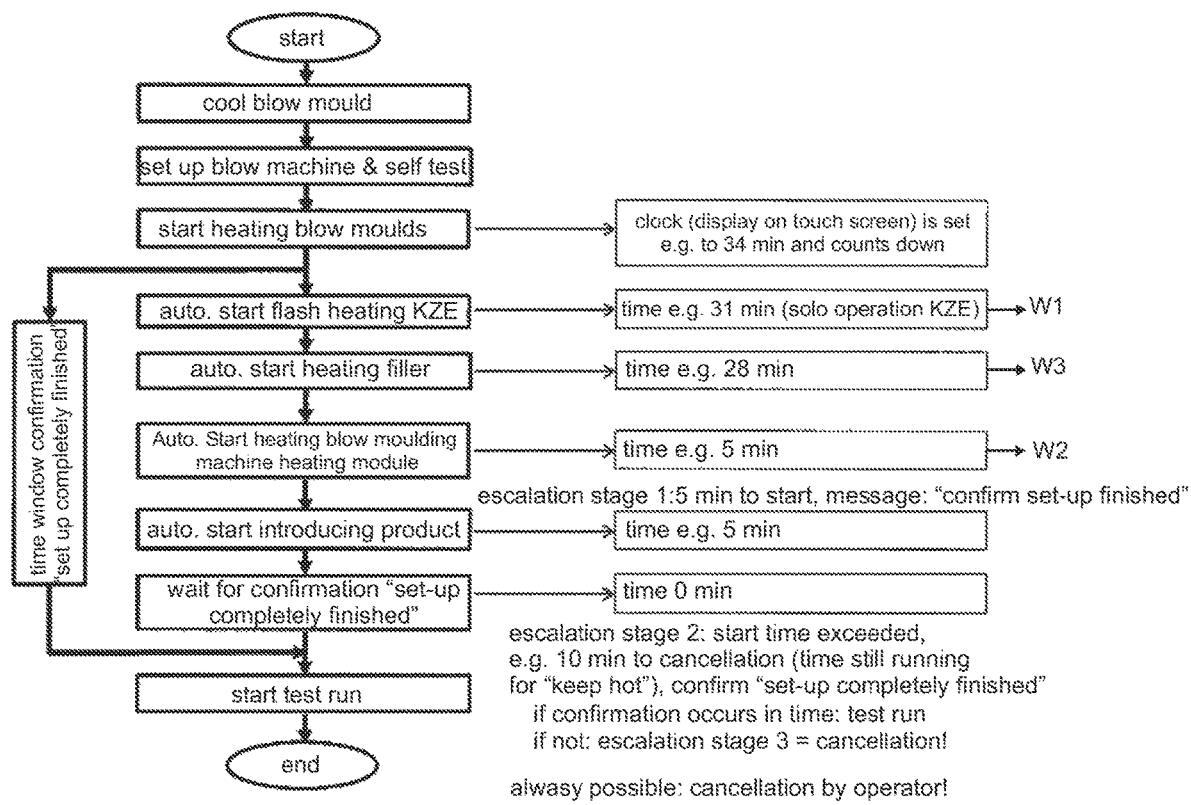
FIG. 2 shows a flow chart for a change of type in a system according to embodiments of the invention.

FIG. 2 shows a schematic sequence for a method of operation according to embodiments of the invention. In this case first of all a system change is initiated. Then the blow moulds to be replaced are cooled, which can take place both actively by means of a cooling liquid and also passively by leaving the respective blow moulds in the machine. In a further process step the transforming device or blow moulding machine is set up and a self-test is preferably performed. In the context of this set-up process the previous blow moulds are replaced by new blow moulds. In the next method step the heating of the blow moulds is started. At this time a starting time is output via an indicator device or a display (in particular a touch screen). This may be an absolute time indication, such as for instance 3.30 p.m., but it would also be possible for a decremental time to be inserted such as here, for example, 34 minutes and the time runs backwards from with this time. These said 34 minutes are a conventional heating time for the blow moulds. The reference numeral W1 designates the output value or the value used or to be used, which is characteristic for the changeover process of the transforming device. In this case the length of time necessary for the heating of the blow moulds and/or the time period over which heating has already taken place is output or used as the value W1. Thus the value W1 may be an output value for a countdown or a running value. In addition, however, values which are characteristic for a heating power can also be taken into consideration.

After a specific time, in this case for example after 3 minutes, the heating of the flash heater 6 is started automatically. This is because, for example, 31 minutes are required for heating the flash heater and therefore in the first 3 minutes after the start of heating the blow moulds it would be unnecessary or inefficient to start the heating of the short-time heater. This is preferably also shown on the display, for example by an indication that the heating of the flash heater has now been started. The reference numeral W3 designates the output value or the value used or to be used, which is characteristic for the changeover process of the flash heater. In this case the value W3 is also a time value.

After a further time period, for example a time of 28 minutes, heating of the filling device is started (again preferably likewise automatically). Here too, the fact that for heating of the filler less time is necessary than for heating of the flash heater and the blow moulds can in turn be taken into consideration. Finally, for instance at a time of 5 minutes, the heating of the oven which is to heat the plastic parisons is started. Accordingly the reference numeral W2 relates to a value which is characteristic for heating of the filling device. Here too, this is a time value.

As a rule this heating lasts for a substantially shorter time, in this case 5 minutes, so that heating time can also be saved here. Optionally it would also be possible, at a further time, for introduction of the product into the machine to be started automatically, i.e. on the one hand to deliver the plastic parisons and possibly also on the other hand to deliver the liquid.

In a further method step a confirmation in particular can be awaited from a user, in which it is confirmed that the conversion process is (mechanically) completely self-contained. If this is the case, a test run can be initiated. This results in the time window illustrated in FIG. 2, within which the user can also carry out the conversion on other machine parts, such as for instance the filler or the oven. Within this time window the conversion process should be concluded, so that at the latest at the expiration of the time a corresponding confirmation can be input. Optionally it would also be possible to introduce a further escalation stage, for example when the starting time has been exceeded. In this case, for a predetermined time both the blow moulds and also the filling device and the flash heating device could be kept hot for a specific time. If after the expiration of this time period it is not confirmed that the set-up is completely accomplished, an interruption of the operation can occur. In addition, however, an interruption of the operation by the user is possible.

A request or alert can also be issued to the user that it now has to confirm the ending of the conversion.

The start of the test run can generally take place when all automatic processes have been concluded and the completion of the rest of the conversion tasks has been confirmed by the operator. This is preferably done by interrogation.

In the absence of the confirmation by the user, a waiting time starts—as mentioned above—i.e. the clock runs until a maximum possible time is reached. This may be limited to 10 minutes for example by the flash heater and the quality requirements. Within for example 5 minutes the confirmation by the user can still take place and then the test run can still begin. After this time the entire process is terminated and must be started again. However, the product is then lost. Alternatively, a rework tank can also be provided into which the product is diverted. In this way further use of the product would be possible.

Figure 3:
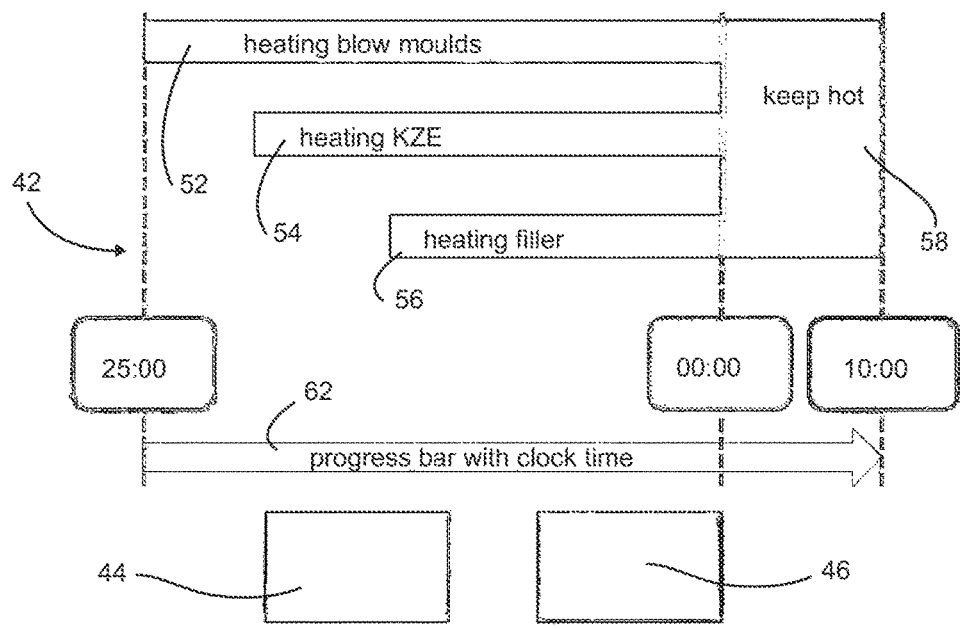
FIG. 3 shows a possible display in sequence for a product changeover.

FIG. 3 shows a possible visual representation of the elapsing times. For example, the expiration time or the heating time for the blow moulds, the flash heater and the filler device can be illustrated by means of bars 52, 54 and 56. The element 58 shows the times in which the said devices are kept warm.

The reference numeral 62 designates a progress bar in which a clock time can be indicated. In addition, individual specified times can also be indicated, such as for instance the start of the heating at 25 minutes, the time at which all heating processes are concluded (at 0 minutes here) and also a time until which the user can still confirm the carrying out of the set-up operations (10 minutes here). Furthermore—as mentioned above—input elements 44 and 46 can be provided, by means of which the user can for instance confirm a conversion process confirm or can also manually terminate the heating. However, these input elements may also be areas to be touched, for instance on a touch screen. In this way a reproducible changeover time can be achieved in particular on block machines by a more highly automated sequence. In addition an energy saving can also be achieved, since no component has to wait unnecessarily or to be heated unnecessarily.

Figure 4:
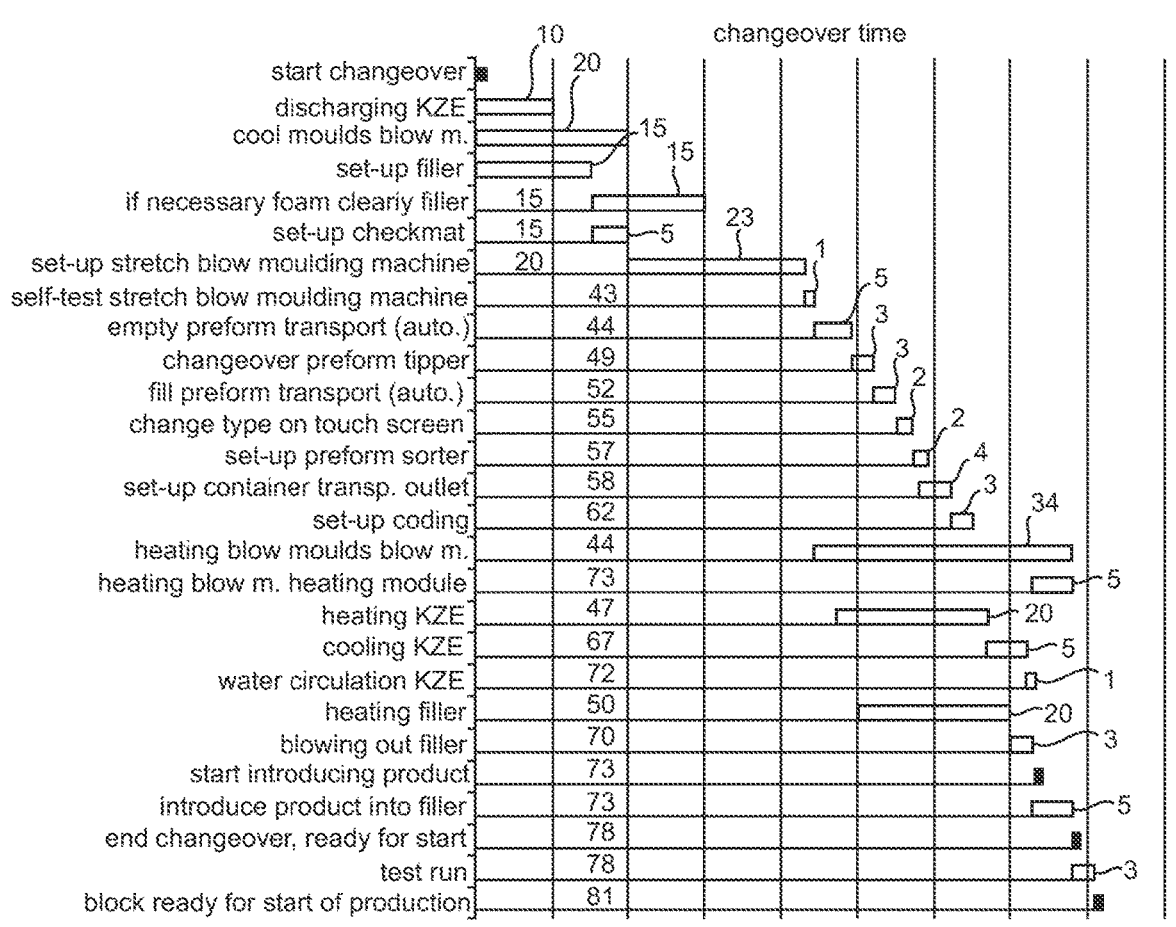
FIG. 4 shows an example of a chronological sequence for a product changeover.

FIG. 4 shows a detailed sequence program or a sequence of a product changeover, which can preferably also be carried out by an operator.

It will be seen here that several sequences or operations are carried out simultaneously, such as for allowing cooling of the blow moulds which are to be replaced and discharging of the short-time heater. During the cooling of the blow moulds the user can already perform a conversion of the filling device and possibly a subsequent foam cleaning of the filler.

Furthermore, during the cooling of the blow moulds a setting-up of the inspection machine (designated in the drawing as the checkmat) can be carried out. After the cooling of the blow mould the stretch blow moulding machine can be converted, which in the example illustrated here takes 23 minutes. This conversion can be followed by a self-test of the stretch blow moulding machine, which takes 1 minute. Further activities can likewise be carried out following this setting-up, for instance emptying of the plastic parison transport means, changeover of a tipper for the plastic parisons and refilling with plastic parisons.

In addition a change of type can also be predetermined on the touch screen, and also new setting-up of the sorter for the plastic parisons and also setting-up for the container transport at the outlet. Lastly a setting-up the encoding can be carried out. For these respective operations corresponding times between 2 and 5 minutes have been estimated here. After the setting-up of the stretch blow moulding machine has been carried out, a heating of the blow moulds can take place. This takes 34 minutes. Already during this heating operation or during the end of this heating operation the oven for the blow moulding machine can also be heated up (this takes 5 minutes) and also the heating as well as cooling of the flash heater can take place in this time sequence. In addition a water circulation can also be put into operation for the flash heater. Furthermore, during the heating of the blow moulds a heating of the filling device can also be carried out, which takes 20 minutes.

Following this, blowing out of the filling device can be carried out and then introduction of the product can be started. After the product has also been introduced into the filler the changeover is ended and a test run can be started (in this case after 78 minutes). After a total of 81 minutes the entire block is ready for the start of production. In this case the entire changeover time of 81 minutes in this case is determined mainly by the length of time required for the cooling of the blow moulds, for setting-up of the stretch blow moulding machine (24 minutes), for heating of the blow moulds (24 minutes) and the test run of 3 minutes. The other operations can be—as illustrated in FIG. 4—carried out in the meantime, without involving an additional loss of time.

The applicant reserves the right to claim all the features disclosed in the application documents as essential to embodiments of the invention in so far as they are individually or in combination novel over the prior art. Furthermore it is pointed out that features which may be advantageous per se have also been described in the individual drawings. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCES

W1, W2, W3 characteristic values
1 system
2 transforming device
4 filling device
6 flash heater (KZE)
8 heating device/preform oven
10 beverage containers/plastic containers
12 closer
20 time management system
22 stock of plastic parisons
32 transport device
36 transport line/cooling device
42 image output device
44, 46 input element
52, 54, 56 bars
38 element
62 progress bar

The invention claimed is:

1. A method for carrying out a changeover process in a system for producing beverage containers, wherein this system in operation produces plastic containers from plastic parisons by a transforming device and these produced containers are transported to a filling device and the containers are filled with a liquid which is heated by a flash heater, wherein at least the transforming device and the filling device are at least intermittently in data communication, wherein the transforming device includes a plurality of blow moulds and an oven for heating the plastic parisons before the plastic parisons are delivered to the plurality of blow moulds, comprising the steps of:

receiving a first input indicating an end of a conversion process, wherein the conversion process is a change of an element of the transforming device or the filling device;

upon receiving the first input, heating to a first operating temperature: the plurality of blow moulds from time T1 to a time T4, heating to a second operating temperature the flash heater from time T2 to a time T4, and heating to a third operating temperature the filling device from time T3 to a time T4, wherein the first, second and third operating temperatures are temperatures at which the plastic parisons are producible or fillable, wherein T1<T2<T3<T4, wherein at time T4 the plurality of blow moulds, the filling device and the flash heater are ready for production of the beverage containers, wherein T4−T1 is a minimum amount of time necessary to heat the plurality of blow moulds to the first operating temperature, wherein T4−T2 is a minimum amount of time necessary to heat the flash heater to the second operating temperature, wherein T4−T3 is a minimum amount of time necessary to heat the filling device to the third operating temperature.

2. The method according to claim 1, further including changing at least one element of the transforming device and/or the filling device.

3. The method according to claim 2, wherein a second input indicating the changeover process is completed is received, wherein upon receiving the second input, a test run of the system is automatically performed.

4. The method according to claim 3, wherein a latest time for the second input is an expiration of a time window beginning at the receipt of the first input and ending at a predetermined time after the plurality of blow moulds and filling device are heated to the first operating temperature and the third operating temperature, respectively.

5. The method according to claim 3, wherein the test run is interrupted after an expiration of a time window wherein the second input is not received.

6. The method according to claim 3, wherein the changeover process is performed in a system for producing beverage containers, wherein the system for producing beverage containers is configured to automatically interrupt the test run.

7. The method according to claim 1, wherein a time for a start of the heating of the element of the filling device is determined as a function of a time for the start of heating of the element of the transforming device.

8. The method according to claim 7, wherein a heating of the oven is started according to a third predetermined time-sequence, wherein the third predetermined time sequence comprises a time sequence selected from a length of time necessary to heat the filling device, a time period over which heating of the filling device has already taken place, a countdown, and a running time period during which the filling device will remain heated.

9. The method according to claim 1, wherein the changeover process takes place by a direct data exchange between the transforming device and the filling device.

10. The method according to claim 9, wherein the changeover process further takes place by a direct data exchange between the transforming device and at least one of the flash heater, a heating device, and a control device.

11. The method according to claim 9, wherein the changeover process further takes place by a direct data exchange between the filling device and at least one of the flash heater, a heating device, and a control device.

12. The method according to claim 1, wherein data is output comprising one or more parameters selected from the group consisting of a duration of heating, a temperature of an element of the transforming device, a temperature of an element of the filling device, and combinations thereof.

13. The method according to claim 1, wherein data comprises one blow mould element of the plurality of blow moulds.

14. The method according to claim 1, wherein a time for a start of a heating of the flash heater is determined as a function of a time for a start of heating of the element of the transforming device such that the start of the heating of the flash heater occurs based on the start of the heating of the element of the transforming device.

15. The method according to claim 1, wherein a heating of the flash heater is started automatically.

16. The method according to claim 1, wherein the transforming device comprises a first control device for controlling the transforming device, wherein the filling device comprises a second control device for controlling the filling device, and wherein the first control device and the second control device are at least intermittently in direct data communication.

17. The method according to claim 1, further comprising:
prior to said heating the plurality of blow moulds, simultaneously cooling the plurality of blow moulds and carrying out changeover procedures on an oven that heats the plastic parisons.

18. A method for carrying out a changeover process in a system for producing beverage containers, wherein this system in operation produces plastic containers from plastic parisons by a transforming device and these produced containers are transported to a filling device and the containers are filled with a liquid, wherein at least the transforming device and the filling device are at least intermittently in data communication, comprising the steps of:
outputting a time value based on a time-dependent changeover status of the transforming device or the filling device; and
carrying out the changeover process of at least the transforming device or the filling device according to a predetermined time sequence based on the time value, wherein the time value comprises at least one of a group selected from a length of time necessary for heating a plurality of blow moulds, a time period over which heating of the transforming device or filling device has already taken place, a countdown for heating of the transforming device or filling device, and a running time period during which the at least the transforming device or the filling device will remain heated;
carrying out a conversion process at least on the transforming device and/or the filling device, wherein at least one element of this transforming device and/or the filling device is changed;
upon receiving a first input indicating an end of the conversion process, heating to a first operating temperature: the plurality of blow moulds from time T1 to a time T4, heating to a second operating temperature a flash heater from time T2 to a time T4, and heating to a third operating temperature the filling device from time T3 to a time T4, wherein the first, second and third operating temperatures are temperatures at which the plastic parisons are producible or fillable, wherein T1<T2<T3<T4, wherein at time T4 the plurality of blow moulds, the filling device and the flash heater are ready for production of the beverage containers, wherein T4−T1 is a minimum amount of time necessary to heat the plurality of blow moulds to the first operating temperature, wherein T4−T2 is a minimum amount of time necessary to heat the flash heater to the second operating temperature, wherein T4−T3 is a minimum amount of time necessary to heat the filling device to the third operating temperature.

19. The method according to claim 18, wherein the transforming device comprises a first control device for controlling the transforming device, wherein the filling device comprises a second control device for controlling the filling device, and wherein the first control device and the second control device are at least intermittently in direct data communication.

20. The method according to claim 18, further comprising:
prior to said heating the plurality of blow moulds, simultaneously cooling the plurality of blow moulds and carrying out changeover procedures on an oven that heats the plastic parisons.

* * * * *